US008914047B1

(12) United States Patent
Tyler

(10) Patent No.: US 8,914,047 B1
(45) Date of Patent: Dec. 16, 2014

(54) SYSTEMS AND METHODS FOR CONTROLLING A COLOR OF A SKIN OF A COMMUNICATION DEVICE

(71) Applicant: Jonathan A. Tyler, Yorktown Heights, NY (US)

(72) Inventor: Jonathan A. Tyler, Yorktown Heights, NY (US)

( * ) Notice: Subject to any disclaimer, the term of this patent is extended or adjusted under 35 U.S.C. 154(b) by 0 days.

(21) Appl. No.: 14/191,155

(22) Filed: Feb. 26, 2014

Related U.S. Application Data

(60) Provisional application No. 61/901,320, filed on Nov. 7, 2013.

(51) Int. Cl.
  *H04W 24/00* (2009.01)
  *H04W 40/20* (2009.01)
  *H04M 1/02* (2006.01)
  *H04W 24/08* (2009.01)

(52) U.S. Cl.
  CPC .............. *H04W 24/08* (2013.01); *H04W 40/20* (2013.01); *H04M 1/0266* (2013.01)
  USPC ...... 455/457; 455/456.1; 455/566; 455/575.1

(58) Field of Classification Search
  USPC .......................... 455/456.1–457, 575.1–575.9
  See application file for complete search history.

(56) References Cited

U.S. PATENT DOCUMENTS

| | | | | |
|---|---|---|---|---|
| 6,608,996 | B1 * | 8/2003 | Laurikka et al. | 455/90.3 |
| 7,443,566 | B2 * | 10/2008 | Lerenius et al. | 359/265 |
| 7,642,528 | B2 * | 1/2010 | Caine et al. | 250/492.1 |
| 8,148,913 | B2 * | 4/2012 | Kerr et al. | 315/291 |
| 8,385,980 | B2 * | 2/2013 | Causey et al. | 455/566 |
| 8,648,691 | B2 * | 2/2014 | Zuo et al. | 340/4.31 |
| 2001/0018332 | A1 * | 8/2001 | Lustila et al. | 455/90 |
| 2005/0130680 | A1 * | 6/2005 | Northcutt | 455/457 |
| 2008/0076400 | A1 * | 3/2008 | Moosavi et al. | 455/418 |
| 2012/0052880 | A1 * | 3/2012 | Hymel et al. | 455/456.3 |
| 2012/0300647 | A1 | 11/2012 | Nandagopal et al. | |

* cited by examiner

*Primary Examiner* — Allahyar Kasraian
(74) *Attorney, Agent, or Firm* — Jonathan A. Tyler

(57) ABSTRACT

A communication device determines a load measure representing a measure of traffic currently handled by a communication node. The color of a skin of the communication device is changed from a first color to a second color associated with availability of a communication node, based on the load measure. The communication device comprises a mobile telephone having a display adapted to display text and images. The skin does not include the display, and the skin comprises at least one surface located on at least two sides of the communication device, one of the at least two sides being a side that does not include the display. The communication node may be, for example, a Wi-Fi access point or a cellular base station.

7 Claims, 13 Drawing Sheets

SYSTEMS AND METHODS FOR CONTROLLING A COLOR OF A SKIN OF A COMMUNICATION DEVICE

This application claims the benefit of U.S. Provisional Patent Application No. 61/901,320, filed on Nov. 7, 2013, which is incorporated herein in its entirety.

TECHNICAL FIELD

This specification relates generally to systems and methods for displaying information, and more particularly to systems and methods for using a communication device to display information.

BACKGROUND

Electrochromic materials have the ability to change color in response to an applied electric field. Electrochromic materials have been used to enhance the functionality of displays used on billboards, in automobiles, and for other purposes.

One type of electrochromic material, referred to as an electrophoretic material, is commonly used in e-reader devices. For example, a simple implementation of an electrophoretic display comprises an apparatus in which titanium dioxide particles approximately one micrometer in diameter are dispersed in a hydrocarbon oil. A dark colored dye is added to the oil, along with surfactants and charging agents that cause the particles to take on an electric charge. This mixture is placed between two parallel, conductive plates separated by a gap of 10 to 100 micrometers. When a voltage is applied across the two plates, the particles will migrate electrophoretically to the plate bearing the opposite charge from that on the particles. When the particles are located at the front (viewing) side of the display, it appears white, because light is scattered back to the viewer by the high-index titania particles. When the particles are located at the rear side of the display, it appears dark, because incident light is absorbed by the colored dye. In this manner, the color of a single pixel can be controlled to be alternatively white or dark.

More recently, electrochromic materials have been developed that can emit a wider range of colors, including red, green, blue, yellow, etc., when different voltages are applied. For example, a variety of technologies have been developed to enable control of the color of individual pixels on a display or surface, such as materials using different colored particles (such as red, green, blue), variously colored filters, subpixels, materials comprising photonic crystals, electrochromic polymer films, etc.

Processing devices, such as personal computers, laptop computers, tablet devices, and cell phones, use various methods to alert or otherwise inform users of certain events. For example, many personal computers, laptop devices, etc., display alert messages on a display screen when a malfunction occurs. Similarly, when battery power is low, many processing devices alert users by displaying a message on the display screen. Many cell phones, personal computers, laptop computers and tablet devices may display a small battery icon in a corner of the display screen with an indication of the amount of power remaining. Similarly, many cell phones and other processing devices display a series of bars in a corner of the screen to indicate the current level of "reception," i.e., whether or not a connection to a communication network is currently available.

SUMMARY

In accordance with an embodiment, a method of controlling a skin color of a communication device is provided. A communication device determines a load measure representing a measure of traffic currently handled by a communication node. The color of a skin of the communication device is changed from a first color to a second color associated with availability of a communication node, based on the load measure. The communication device comprises a mobile telephone having a display adapted to display text and images. The skin does not include the display, and the skin comprises at least one surface located on at least two sides of the communication device, one of the at least two sides being a side that does not include the display. The communication node may be, for example, a Wi-Fi access point or a cellular base station.

In other embodiments, the communication device may be a personal computer, a laptop computer, a tablet device, or another type of communication device.

In one embodiment, the communication node is a Wi-Fi access point. The communication device enters a promiscuous mode in order to detect frames transmitted by a Wi-Fi access point. A beacon frame transmitted by the access point is identified via a particular Wi-Fi channel, and a selected field in the beacon frame is examined to identify the access point.

In another embodiment, the communication node is a cellular base station. One or more cellular frames are received, and the cellular base station is identified, based on information in a base station identifier field of the at least one cellular frame.

In another embodiment, the load measure comprises a time interval measure representing a time interval between frames received from the communication node. The color of the skin of the communication device is changed from a first color to a second color associated with availability of a communication node, in response to determining that the time interval measure is greater than a predetermined limit. The time interval measure may represent an average time interval between frames received from the communication node, for example.

In another embodiment, the load measure is determined based on a number of communication devices that are currently using the communication node.

In one embodiment, the skin comprises an electrochromic material.

In accordance with another embodiment, a communication device is provided. The device includes a display adapted to display text and images, and a skin adapted to change from a first color to a second color. The skin does not include the display, and the skin comprises at least one surface located on at least two sides of the communication device, one of the at least two sides being a side that does not include the display. The device also includes at least one processor adapted to determine a load measure representing a measure of traffic currently handled by a communication node, and cause the skin to change from the first color to the second color, based on the load measure.

In accordance with another embodiment, a method of controlling a skin of a communication device is provided. A first distance between a communication device and a specified location is determined at a first time. The color of the skin of the communication device is changed from a first color to a second color, in response to determining that the first distance between a communication device and a specified location is less than a first predetermined distance. A second distance between the communication device and the specified location is determined at a second time, and the color of the skin of the communication device is changed to a third color, in response to determining that the second distance between the communication device and the specified location is less than a second predetermined distance.

In one embodiment, the location of the communication device is determined based on GPS signals.

In another embodiment, the communication device receives, from a user, a start location and a destination location. A route between the start location and the destination location is determined. One or more intermediate locations associated with the route are identified, and a selected one of the intermediate locations is designated as the specified location. For example, the specified location may be an address, an intersection, a highway exit, etc.

These and other advantages of the present disclosure will be apparent to those of ordinary skill in the art by reference to the following Detailed Description and the accompanying drawings.

DETAILED DESCRIPTION

Figure 1A:
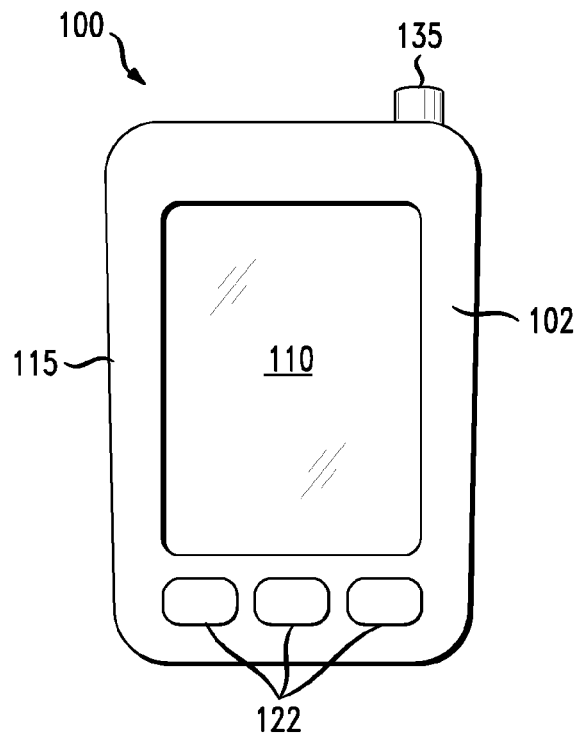
FIG. 1A shows a front side 102 of communication device 100 in accordance with an embodiment.
Figure 1B:
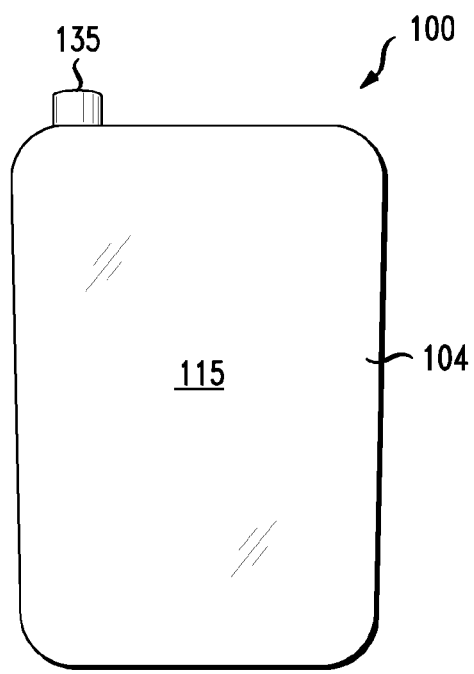
FIG. 1B shows a back side of a communication device in accordance with an embodiment.

In accordance with an embodiment, a communication device having a skin capable of changing color communicates wirelessly with a network. When an event or condition is detected, the color of the device's skin changes to a color associated with the event or condition. In this manner, a user of the device is notified of the event or condition. FIGS. 1A-1B shows a communication device in accordance with an embodiment. Specifically, FIG. 1A shows a front side 102 of communication device 100, while FIG. 1B shows a back side 104 of device 100. Communication device 100 comprises a display 110, a skin 115, a plurality of buttons 122, and an antenna 135. In the illustrative embodiment of FIGS. 1A-1B, communication device 100 is a mobile telephone (such as a cell phone). In other embodiments, communication device 100 may be another type of communication device.

Display 110 is adapted to display images, text, Web pages, and other information to a user. For example, display 110 may be a liquid crystal display (LCD) screen of a mobile telephone, or a display screen of a personal computer, laptop computer, tablet device, etc. Buttons 122 may be employed by a user to input information, make selections, etc. Antenna 135 transmits and receives signals wirelessly to and from other devices, to and from one or more networks, etc.

Skin 115 covers a substantial percentage of the external surface of communication device 100 (excluding display 110). Skin 115 may be located on one side of communication device 100 or on more than one side of device 100. In the illustrative embodiment of FIGS. 1A-1B, skin 115 comprises one or more surfaces located on at least two sides of the communication device, one of the two sides being a side (such as the back side of device 100) that does not include display 110. In the illustrative embodiment, skin 115 excludes display 110 and is constructed of a different material than display 110. Referring to FIG. 1A, skin 115 covers a portion of front side 102 of device 100 around display 110 (but not including display 110) and around buttons 122. Referring to FIG. 1B, skin 115 also covers all or nearly all of back side 104 of device 100. Skin 115 may also cover some or all of other sides of device 100.

Figure 1C:
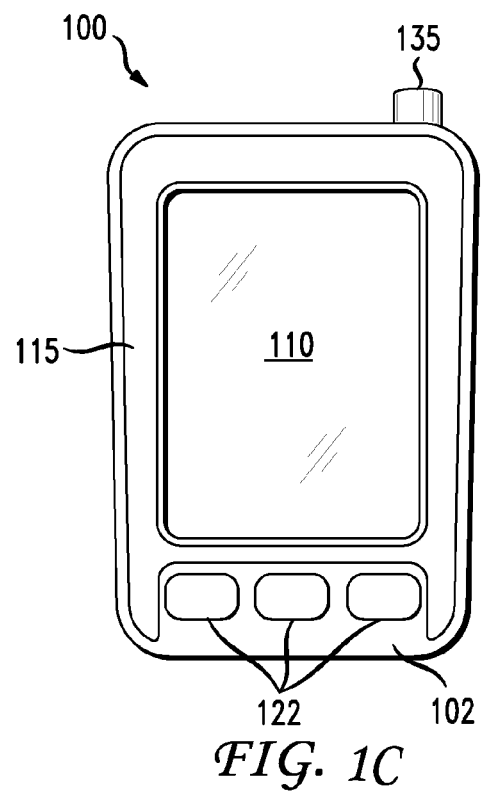
FIGS. 1C-1D show a communication device in accordance with another embodiment.
Figure 1D:
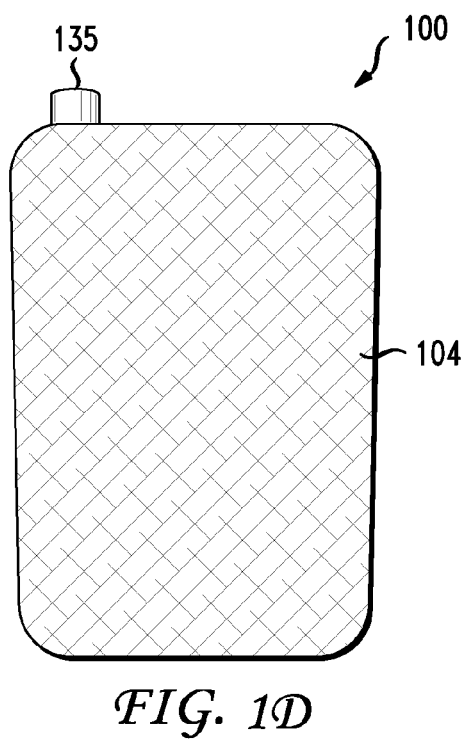

FIGS. 1C-1D show communication device 100 in accordance with another embodiment. Skin 115 comprises a surface that is located on only one side of communication device 100), and does not include display 110. Specifically, skin 115 covers a substantial portion of front side 115 of device 100 (excluding display 110), but does not cover any portion of any other side. Referring to FIG. 1D, for example, no portion of skin 115 is located on back side 104 of device 100.

Figure 1E:
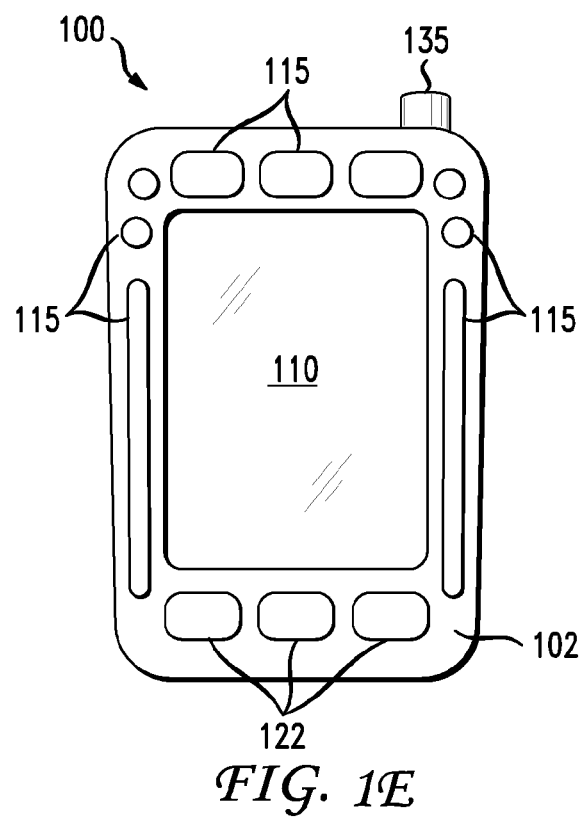
FIGS. 1E-1F show a communication device in accordance with another embodiment.
Figure 1F:
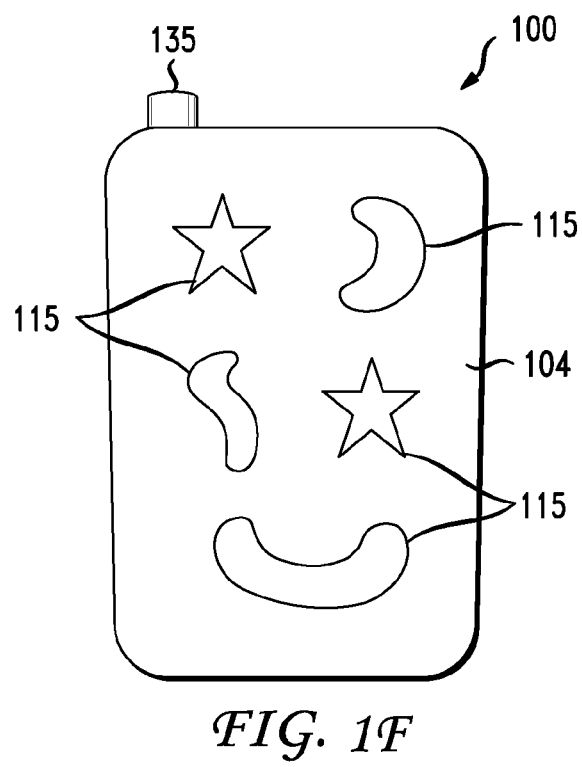

FIGS. 1E-1F show communication device 100 in accordance with another embodiment. Skin 115 comprises a plurality of separate surfaces that are located on one or more sides of communication device 100 (not including display 110). More specifically, skin 115 comprises a plurality of surfaces having a variety of shapes, including substantially linear shapes, circular shapes, rectangular shapes, etc. For example, portions of skin 115 located on front side 102 have circular, rectangular, and linear shapes. Portions of skin 115 located on back side 104 have star shapes, crescent moon shapes, and other designs. Any desired shape may be used.

In other embodiments, skin 115 may include display 110.

While FIGS. 1A-1F illustrate communication device 100 as a mobile telephone, FIGS. 1A-1F are not to be construed as limiting. In other embodiments, communication device 100 may be another type of device, such as a laptop computer, a personal computer, a tablet device, a personal digital assistant, a multimedia player, etc. In other embodiments, skin 115 may be disposed on one or more sides of communication device 100.

In another embodiment, communication device 100 is a watch or smartwatch. Skin 115 may be disposed on the face of the watch, on an edge around the face of the watch, on a cover that covers the face of the watch, and/or on the watchband, for example, or on another part of the watch.

In another embodiment, communication device 100 is a pair of glasses or smartglasses. Skin 115 may be disposed on the rims of the glasses and/or on the lenses, for example, or on another part of the glasses.

In other embodiments, communication device 100 may comprise a bracelet, a camera, writing device such as a pen, a keychain, a laptop device, a tablet device, a television, a radio, etc. In other embodiments, communication device 100 may be a component of a clothing accessory.

Figure 2:
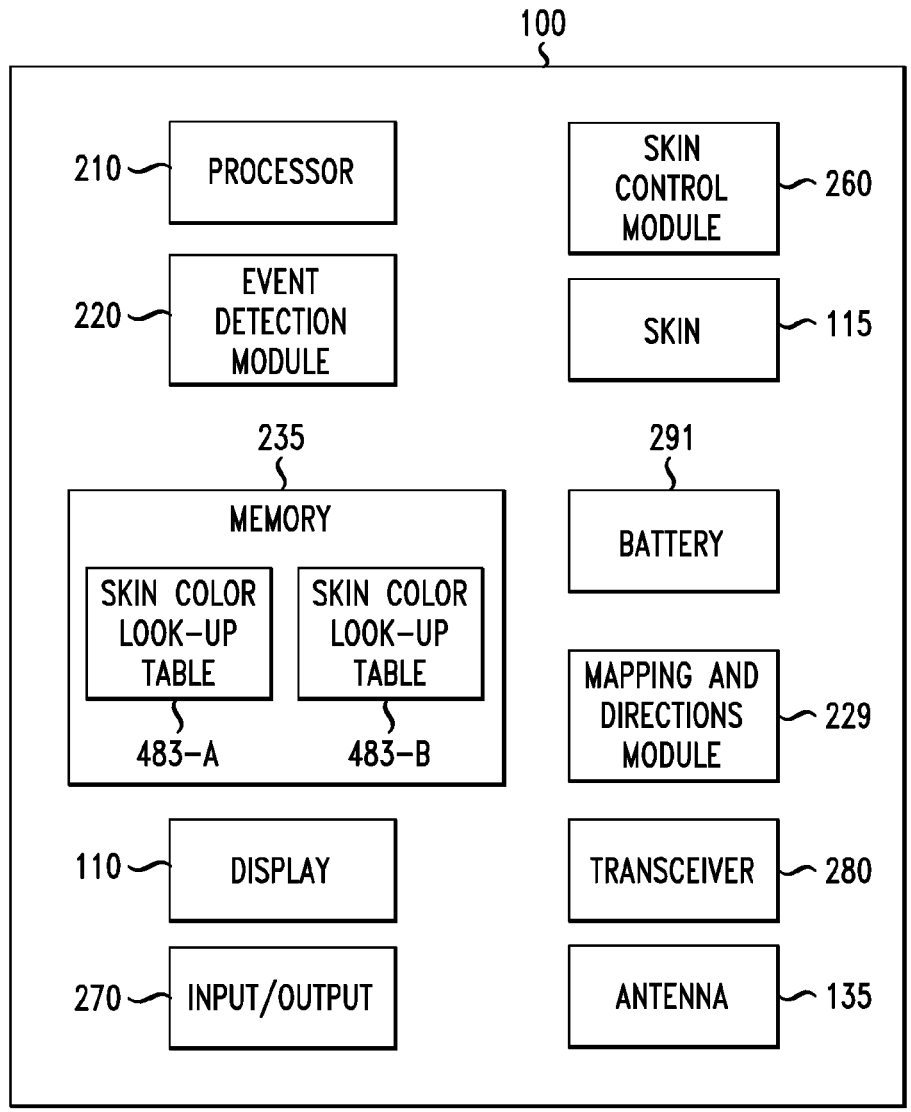
FIG. 2 shows functional components of a communication device in accordance with an embodiment.

FIG. 2 shows functional components of communication device 100) in accordance with an embodiment. Communication device 100 comprises skin 115, display 110, and antenna 135, which are also illustrated in FIG. 1. Communication device 100 also comprises a processor 210, an event detection module 220, a skin control module 260, a memory 235, a transceiver 280, one or more input/output devices 270, and a battery 291.

In the illustrative embodiment, the overall functioning of communication device 100 is controlled by processor 210, which operates by executing computer program instructions which are stored in memory 235 and/or loaded into memory 235 when execution of the computer program instructions is desired. These computer program instructions define the overall operation of communication device 100. Thus, the method steps that are described herein and outlined in FIGS. 3, 8A-8D, 9A-9B, and/or 11, for example, can be defined by the computer program instructions stored in the memory 235 and controlled by the processor 210 executing the computer program instructions. For example, the computer program instructions can be implemented as computer executable code programmed by one skilled in the art to perform an algorithm defined by the method steps that are described herein and outlined in FIGS. 3, 8A-8D, 9A-9B, and/or 11, for example. Accordingly, by executing the computer program instructions, the processor 210 executes an algorithm defined by the method steps that are described herein and outlined in FIGS. 3, 8A-8D, 9A-9B, and/or 11, for example.

Memory 235 may comprise any data storage device adapted to storing data, such as random access memory (RAM), read only memory (ROM), one or more disk drives, magnetic disk, CD ROM, or other computer readable medium. Memory 235 may also store other data which may be necessary for the operation of communication device 100. In addition, memory 235 has at least a portion of which is non-volatile, such that the information contained therein remains after power to communication device 100 is turned off. Although FIG. 2 shows memory 235 as one component, memory 235 may be implemented with separate memory units.

Input/output devices 270 receive various types of information from users and/or from the environment, and transmit information to users. For example, input/output devices 270 may include buttons 122 (shown in FIG. 1), and may also include, for example, a keypad, one or more microphones, one or more audio speakers, etc.

Transceiver 280 sends and receives signals via antenna 135. Antenna 135 transmits and receives various types of signals (e.g., electromagnetic waves having various frequencies). Battery 291 provides power for the operation of communication device 100.

Skin 115 is adapted to change color from a first color to a second color based on control signals generated by skin control module 260. Skin 115 may comprise any material capable of changing color. In one embodiment, skin 115 comprises an electrochromic material and therefore can change color in response to an applied electric field. In the illustrative embodiment, skin 115 comprises an apparatus in which a voltage is applied based on signals received from skin control module 260; accordingly, the color of skin 115 changes based on the signals received from skin control module 260. For example, skin 115 may comprise an electrophoretic material. In other embodiments, skin 115 may comprise an electrowetting display, a dielectrophoresis display, or a bistable LCD. In other embodiments, skin 115 may be constructed of other types of materials capable of changing color, such as, for example, a material comprising one or more filters, one or more subpixels, a material comprising photonic crystals, etc. Other types of materials may be used.

Skin 115 may have a default color, such as gray, for example. For example, when a user turns on communication device 100, skin 115 may change to the default color. In some embodiments, skin 115 remains the default color when turned off (absent any control signals from skin control module 260).

Skin control module 260 from time to time receives from event detection module 220 information indicating an event or condition, and/or a selected color, and, in response, causes skin 115 to change from a first color to a second color based on the information. For example, event detection module 220 may instruct skin control module 260 to cause skin 115 to change from a default color to a second color specified by event detection module 220.

Event detection module 220 monitors one or more parameters and from time to time detects an event or condition based on the parameters. When an event or condition is detected, event detection module 220 may transmit to skin control module 260 an instruction or other signal associated with the event or condition. For example, event detection module 260 may transmit to skin control module 260 a signal indicating a color associated with the event or condition and an instruction to change the color of skin 115 to the indicated color.

In certain embodiments, event detection module 220 is a software application configured to detect a selected event or condition and cause skin 115 to change color from a first color to a second color in response to detecting the event or condition. Event detection module 220 may comprise a software application installed on communication device 100 prior to purchase, or a software application downloaded from the Internet.

Mapping and directions module 229 provides a mapping and directions service to users. From time to time, mapping and directions module 229 may receive directly from a user, or from another component of communication device 100, a specified location and, in response, provide map information relating to the specified location. Also, from time to time, mapping and directions module 229 may receive directly from a user, or from another component of communication device 100, a start location and a destination location and, in response, provide a preferred route from the start location to the destination location, including various roads, bridges, and other landmarks that may be associated with the preferred route. Mapping and directions module 229 may utilize GPS signals received via antenna 135.

It is to be understood that FIGS. 1A-1F and FIG. 2 are for illustrative purposes only. The design and operation of various types of processing devices, including wireless devices, are well known in the art and various modifications are possible. Communication device 100 may include other components not shown in FIGS. 1A-1F and FIG. 2. Furthermore, other devices may be used.

Current processing devices, including cell phones, personal computers, laptop computers, tablet devices, cell phones, etc., are capable of detecting certain defined events and conditions, and informing or alerting a user of these events or conditions. For example, many personal computers and laptop devices display alert messages on a display screen when a malfunction occurs. Similarly, when battery power is low, many processing devices alert users by displaying a message on the display screen. Many cell phones, personal computers, laptop computers and tablet devices may display a small battery icon in a corner of the display screen with an indication of the amount of power remaining. Similarly, many cell phones and other processing devices display a series of bars in a corner of the screen to indicate the current level of "reception," i.e., whether or not access to a communication network is currently available.

However, existing processing devices typically fail to provide a readily visible signal indicating the occurrence of an event or condition. For example, many people find that looking in the corner of a display screen on a computer or cell phone (in order to determine whether or not there is network connectivity, or to determine the level of battery power), is inconvenient or even difficult. For example, the small symbols or icons typically located in a corner of a display screen often cannot be seen from a distance.

Figure 3:
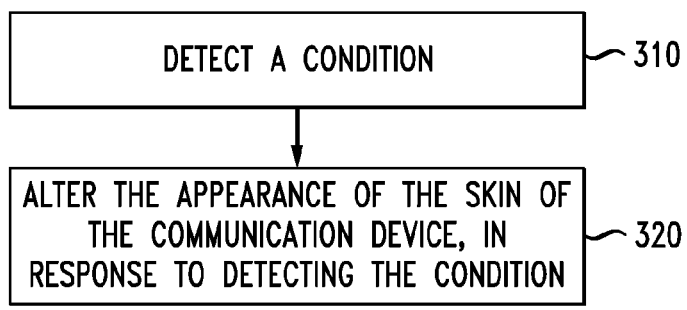
FIG. 3 is a flowchart of a method of generating a visible signal by changing the color of the skin of a communication device in accordance with an embodiment.

Accordingly, improved systems, methods, and apparatus for signaling or alerting a user to the occurrence of an event or condition are provided. In accordance with an embodiment, communication device 100 detects an event or condition, and in response generates a visible signal associated with the event or condition. For example, communication device 100 may cause skin 115 to change to a color associated with the event or condition. FIG. 3 is a flowchart of a method of generating a visible signal by changing the color of the skin of a communication device in accordance with an embodiment.

At step 310, a condition is detected. In an illustrative embodiment, event detection module 220 monitors the level of power remaining in battery 291. When the power level in battery 291 is equal to or greater than a predetermined limit, event detection module 220 identifies a first color associated with "high power level" and instructs skin control module 260 to change skin 115 to the first color. When the power level in battery 291 is less than the predetermined limit, event detection module 220 identifies a second color associated with "low power level" and instructs skin control module 260 to change skin 115 to the second color.

Figure 4:
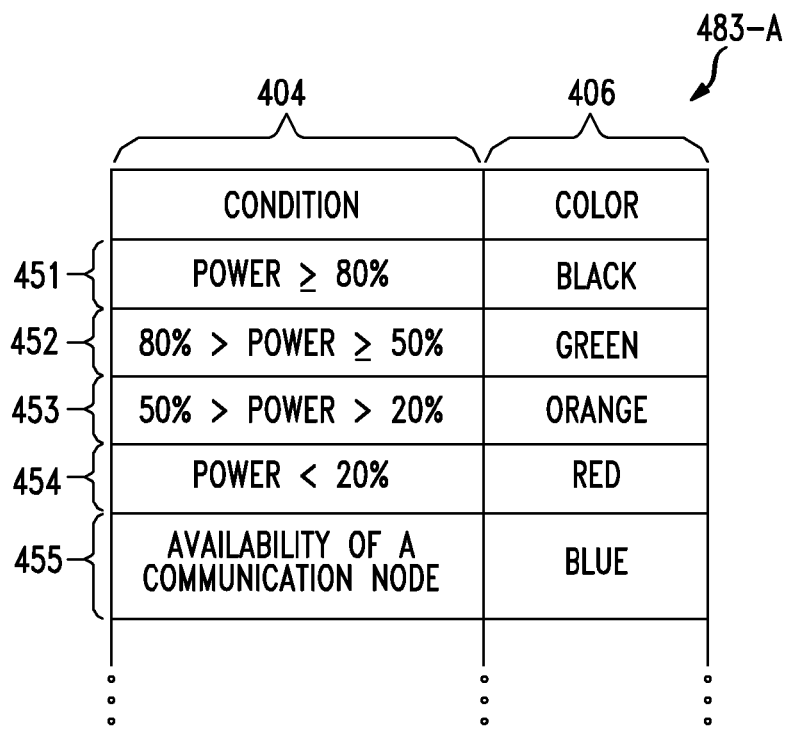
FIG. 4 shows an example of a skin color look-up table in accordance with an embodiment.

In one embodiment, event detection module 220 accesses a skin color look-up table to determine an appropriate color. FIG. 4 shows an example of a skin color look-up table 483-A in accordance with an embodiment. Skin color look-up table 483-A comprises two columns 404 and 406. Column 404 defines a condition or event; column 406 specifies a skin color associated with the condition or event. For example, rows 451-454 indicate that when remaining battery power is above 80%, the associated skin color is BLACK; when remaining battery power is between 50% and 80%, the associated skin color is GREEN; when remaining battery power is between 20% and 50%, the associated skin color is ORANGE; and when remaining battery power is below 20%, the associated skin color is RED.

Suppose that when a user turns on communication device 100, event detection module 220 examines battery 291 and determines that remaining battery power is 35%. Event detection module 220 consults look-up table 483-A and determines that the associated skin color is ORANGE. Event detection module 220 accordingly transmits an instruction to skin control module 260 to change the skin color to ORANGE.

At step 320, an appearance of the skin of the communication device is altered, in response to the detection of the condition. Skin control module 260 receives the instruction from event detection module 220 and, in response, causes the color of skin 115 to turn to ORANGE. In this manner, communication device 100 provides a visible signal to a user concerning the amount of remaining battery power.

In another embodiment, skin control module 260 may cause skin 115 to "flash," i.e., to alternate between a first color and a second color, to indicate detection of a particular condition or event. In other embodiments, skin control module 260 may cause a first portion of skin 115 to change from a first color to a second color, and a second portion of skin 115 to change from the first color to a third color. For example, the top half of communication device 100 may change to a selected color, or may flash between two selected colors.

In some embodiments, a change in color by skin 115 may be accompanied by an audio signal. For example, event detection module 220 may cause communication device 100 to emit a selected sound (a beep, a song, an alarm, etc.) in addition to causing skin 115 to change color.

Changing the color of skin 115 provides a readily visible signal to a user that a particular event or condition has been detected. Advantageously, such a readily visible signal is more easily seen by a user than existing signals (such as a battery icon, or a series of bars, shown in a corner of a display screen). For example, a passenger in a vehicle who wishes to make a call with a cell phone but is in a location without reception may simply place the cell phone down and subsequently be notified when the vehicle enters an area with better reception, without needing to regularly pick up the cell phone and look at a series of bars on the display screen.

The triggering event or condition may be any type of event or condition. In another illustrative embodiment, skin 115 of communication device 100 changes color when communication device 100 detects an event or condition based on signals received wirelessly via a communication network.

Figure 5:
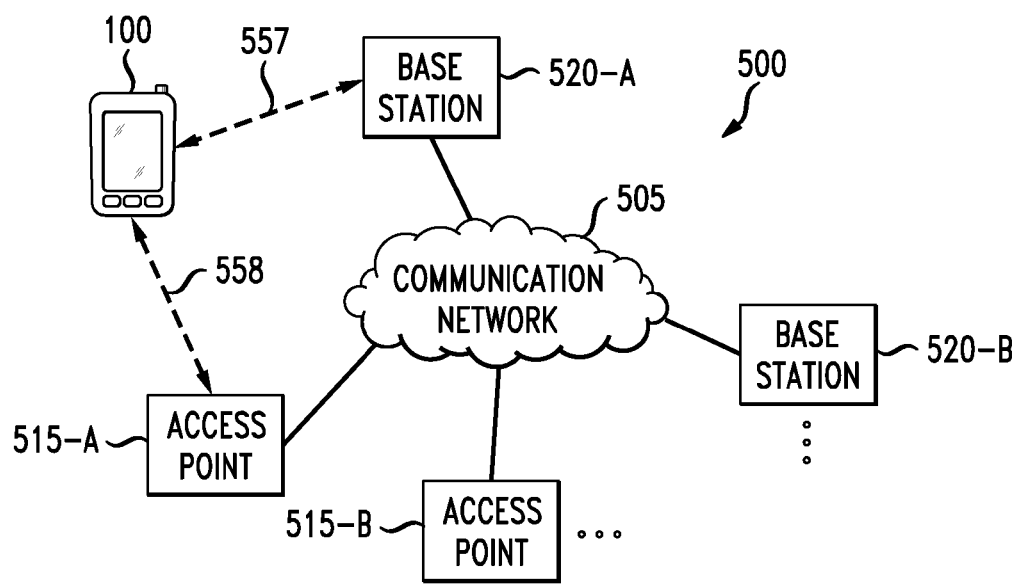
FIG. 5 shows a communication system in accordance with an embodiment.

FIG. 5 shows a communication system 500 in accordance with an embodiment. Communication system 500 comprises a network 505, a plurality of Wi-Fi access points 515-A, 515-B, etc., and a plurality of cellular base stations 520-A, 520-B, etc. As shown in FIG. 5, a device such as communication device 100 may use communication system 500 to achieve wireless connectivity in order to conduct communications with another device (not shown).

In one embodiment shown in FIG. 5, network 505 may comprise, for example, an Internet Protocol (IP) backbone (not shown) through which data is transmitted. Network 505 may be connected to other networks, such as an optical network. Network 505 may comprise the Internet, for example. In other embodiments, network 505 may comprise one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 505 may comprise a combination of different types of networks.

In the illustrative embodiment of FIG. 5, each access point 515 provides a wireless local area network (WLAN) in a local area in the vicinity of the access point, in compliance with the Wi-Fi standards provided by the Wi-Fi alliance. The WLANs of two access points 515 may overlap. Accordingly, an access point 515 may provide wireless connectivity to a communication device 100 in accordance with the Wi-Fi protocol. Use of access points and use of Wi-Fi protocols are known.

Base stations 520 may provide to communication device 100 wireless connectivity for cellular communications according to any one of a variety of protocols, such as a code division multiple access (CDMA, CDMA200) protocol, a wideband-CDMA (WCDMA) protocol, a Universal Mobile Telecommunications System (UMTS) protocol, a Global System for Mobile Telecommunications (GSM) protocol, etc. Other protocols for cellular communications may be used. For example, other 3G (or 4G) protocols may be used. Use of base stations and use of cellular communications protocols are known.

Figure 6A:
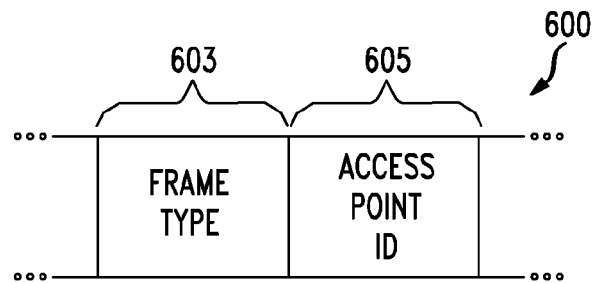
FIG. 6A shows an exemplary Wi-Fi frame referred to as a beacon frame.

In accordance with Wi-Fi standards, each access point 515 from time to time transmits a data packet referred to as a frame. FIG. 6A shows an exemplary Wi-Fi frame 600 referred to as a beacon frame. Beacon frame 600 comprises multiple fields containing various types of data, including a FRAME TYPE field 603, which contains information indicating that the frame is a beacon frame, and an ACCESS POINT ID field 605, which includes information identifying the particular access point 615 that transmitted the frame.

Figure 6B:
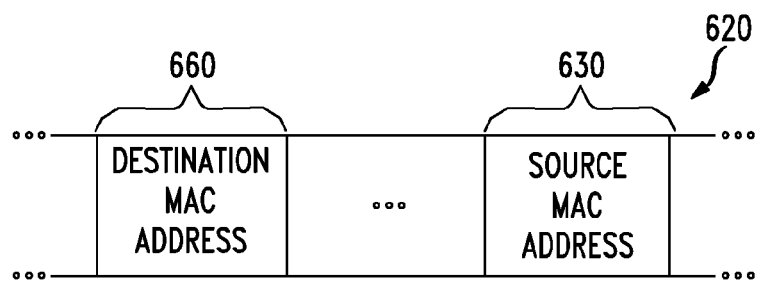
FIG. 6B shows another exemplary Wi-Fi frame.

Each Wi-Fi access point 615 may also from time to time transmit other types of frames, which may have a structure similar to that of frame 620 shown in FIG. 6B. Frame 620 comprises multiple fields including a SOURCE MAC ADDRESS field 630 and a DESTINATION MAC ADDRESS field 660. SOURCE MAC ADDRESS field 630 includes information identifying the access point that transmits the frame. DESTINATION MAC ADDRESS field 660 includes information identifying a communication device to which the frame is directed.

Figure 7A:
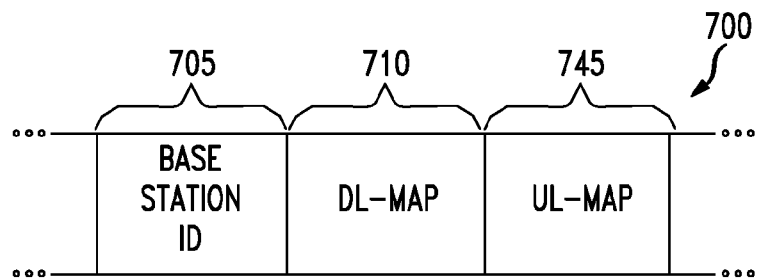
FIG. 7A is an example of an exemplary cellular frame that may be transmitted by a cellular base station.
Figure 7B:
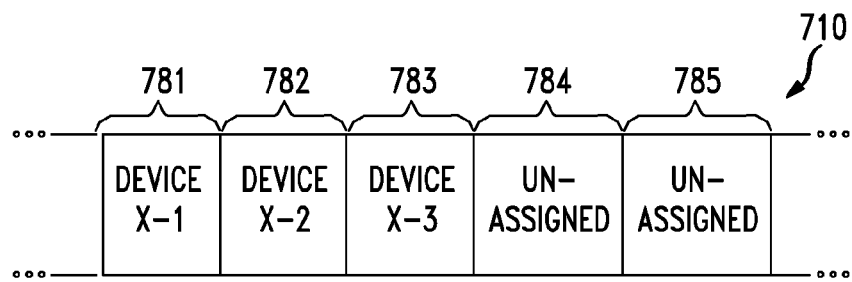
FIG. 7B shows a plurality of subframes within a field of a cellular frame.

In accordance with existing cellular standards, each base station 520 uses a defined channel, referred to as a common control channel, to communicate certain information to communication devices that are currently using the base station. Each base station 520 also uses a downlink data control channel to transmit information to various communication devices, and an uplink data control channel to receive information from communication devices. From time to time, each base station 520 transmits via the common control channel a cellular frame containing various types of information, including information indicating the assignment of time slots in a subsequent frame to be transmitted via the downlink data control channel, and information indicating the assignment of time slots in the uplink data control channel. FIG. 7A is an example of an exemplary cellular frame 700 that may be transmitted by a base station 520. Frame 700 comprises BASE STATION ID field 705, containing information identifying the base station that transmits the cellular frame, a downlink map (DL-MAP) field 710, and an uplink map (UL-MAP) field 745. DL-MAP field 710 comprises a plurality of subframes, as shown in FIG. 7B. In the illustrative embodiment of FIG. 7B, subframes 781-785 contain information indicating the assignment of time slots in a subsequent frame to be transmitted via the downlink data control channel. Specifically, subframe 781 contains information indicating that a corresponding subchannel in a subsequent frame will contain information directed to a communication device X-1; subframe 782 contains information indicating that a corresponding subchannel in the subsequent frame will contain information directed to a communication device X-2; subframe 783 contains information indicating that a corresponding subchannel in the subsequent frame will contain information directed to a communication device X-3. Subframes 784 and 785 indicate that corresponding subchannels in the subsequent frame are unassigned.

UL-MAP field 745 has a structure similar to that of DL-MAP field 710. Accordingly, UL-MAP field 745 comprises a plurality of subframes containing information indicating the assignment of time slots in the uplink data control channel.

In the illustrative embodiment, communication device 100 is a mobile telephone or other device having both Wi-Fi and cellular capabilities and therefore is able to communicate either via a Wi-Fi access point or via a cellular base station. Accordingly, when a user of communication device 100 wishes to communicate via network 505, the user may access network 505 via a Wi-Fi access point 515 (for example, via wireless link 558) or a cellular base station 520 (for example, via wireless link 557).

In other embodiments, device 100 has only Wi-Fi capability and therefore may communicate only via a Wi-Fi access point 515. In other embodiments, device 100 has only cellular capability and therefore may communicate only via a cellular base station 520.

In accordance with an embodiment, communication device 100 identifies a node in a network, determines a status of the node, and changes the color of skin 115 from a first color to a second color based on the status of the node. As used herein, the meaning of the term node encompasses a Wi-Fi access point, such as an access point 515, and a cellular base station, such as a base station 520. By changing the color of skin 115, communication device 100 provides a visible signal to a user concerning the status of the node.

Suppose, for example, that a user is holding communication device 100 while walking along a street, or while riding as a passenger in a car or bus. Suppose further that the user wishes to employ communication device 100 to make a telephone call or to access the Internet, for example, and turns on communication device 100. When turned on, communication device 100 may cause skin 115 to change to a default color (for example, gray).

Figure 8A:
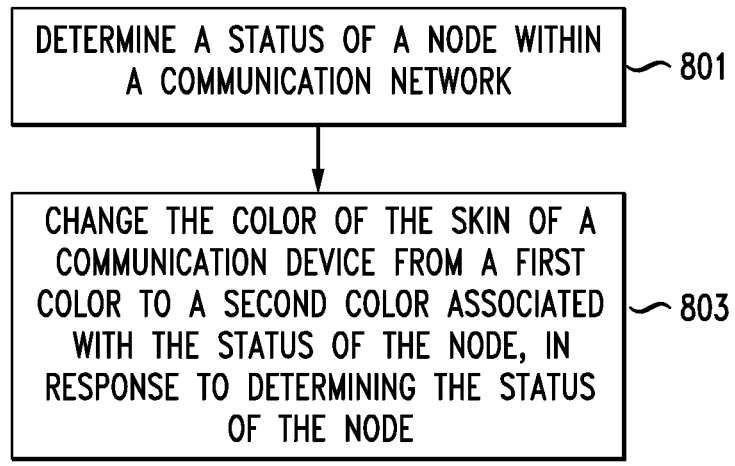
FIG. 8A is a flowchart of a method of generating a visible signal by controlling the color of the skin of a communication device in accordance with an embodiment.

In one embodiment, communication device 100 changes the color of skin 115 when communication device 100 detects a node having sufficient capacity to handle additional traffic and maintain a desired quality of service. FIG. 8A is a flowchart of a method of generating a visible signal by controlling the color of the skin of a communication device in accordance with an embodiment.

At step 801, a status of a node within a communication network is determined. For example, event detection module 220 may detect that a nearby Wi-Fi access point or cellular base station currently has available capacity to handle additional traffic while maintaining a desired quality of service. At step 803, the color of the skin of a communication device is changed from a first color to a second color associated with the status of the node, in response to determining the status of the node. Thus, skin control module 260 causes skin 115 to change from a first color to a second color associated with availability of a communication node, in response to the detection of the available node. For example, event detection module 220 may examine record 455 of look-up table 483-A (shown in FIG. 4), and determine that the color associated with availability of a communication node is BLUE. Event detection module 220 then causes skin control module 260 to change the color of skin 115 to BLUE.

In another embodiment, communication device 100 may cause skin 115 to "flash," i.e., to alternate between a first color and a second color, to indicate availability of a communication node.

In accordance with another embodiment, communication device 100 changes the color of skin 115 to a first color when a Wi-Fi access point 515 is detected, and changes the color of skin 115 to a second color when a cellular base station 520 is detected. Several embodiments of these and other methods are described in more detail below.

In accordance with one embodiment, communication device 100 identifies a Wi-Fi access point, determines a load measure associated with the access point, determines whether or not the access point has sufficient available capacity to handle additional traffic while maintaining a desired quality of service, based on the load measure, and causes skin 115 to change from a first color to a second color if the load measure indicates that the access point has sufficient available capacity to handle additional traffic and maintain a desired quality of service.

For example, communication device 100 may enter a promiscuous mode in accordance with Wi-Fi standards. The promiscuous mode enables communication device 100 to receive certain types of information via particular Wi-Fi channels. For example, a communication device 100 in promiscuous mode may receive any frame transmitted by an access point via a selected Wi-Fi channel. In the illustrative embodiment, communication device 100 stores information defining channels associated with the Wi-Fi protocol. For example, communication device 100 may include a Wi-Fi card holding information that defines thirteen channels associated with the 802.11g Wi-Fi protocol.

Figure 8B:
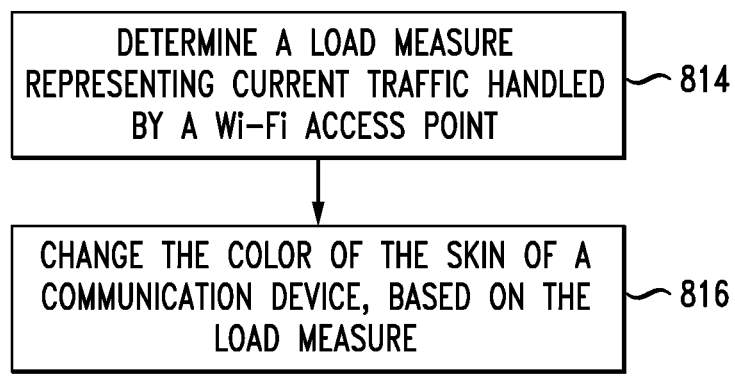
FIG. 8B is a flowchart of a method of controlling the color of the skin of a communication device in accordance with an embodiment.

FIG. 8B is a flowchart of a method of controlling the color of the skin of a communication device in accordance with an embodiment. At step 814, a load measure representing current traffic handled by a Wi-Fi access point is determined. Communication device 100 accesses a selected Wi-Fi channel and monitors the information being transmitted via the channel. In the illustrative embodiment, one or more frames are received by communication device 100, for example, by antenna 135. In a well-known manner, communication device 100 identifies a beacon frame transmitted by an access point 515, such as beacon frame 600, examines ACCESS POINT ID field 605 in the beacon frame, and identifies the access point.

After identifying an access point 515, communication device 100 monitors the selected channel and receives a plurality of other frames transmitted by the access point. Communication device 100 may receive frames similar to frame 620 of FIG. 6B, for example. In one embodiment, communication device 100 monitors the selected channel during a predetermined time period T and detects any frames transmitted by the access point during the period. T may be a predetermined number of milliseconds, for example.

Based on information in the frames received, communication device 100 determines a load measure associated with the access point. For example, in one embodiment, device 100 may determine a load measure based on the time between frames transmitted, a number of communication devices currently using the access point, and/or other types of information.

At step 816, a color of a skin of a communication device is changed, based on the load measure. For example, if the load measure indicates that the access point can handle additional traffic and maintain a desired quality of service, event detection module 220 may cause the color of skin 115 to change from the default color to a second color associated with availability of a Wi-Fi access point. If the load measure indicates that the access point cannot handle additional traffic and maintain a desired quality of service, the color of skin 115 may remain unchanged (as the default color, for example).

In another embodiment, communication device 100 may cause skin 115 to "flash," i.e., to alternate between a first color and a second color, to indicate availability of a Wi-Fi access point.

Figure 8C:
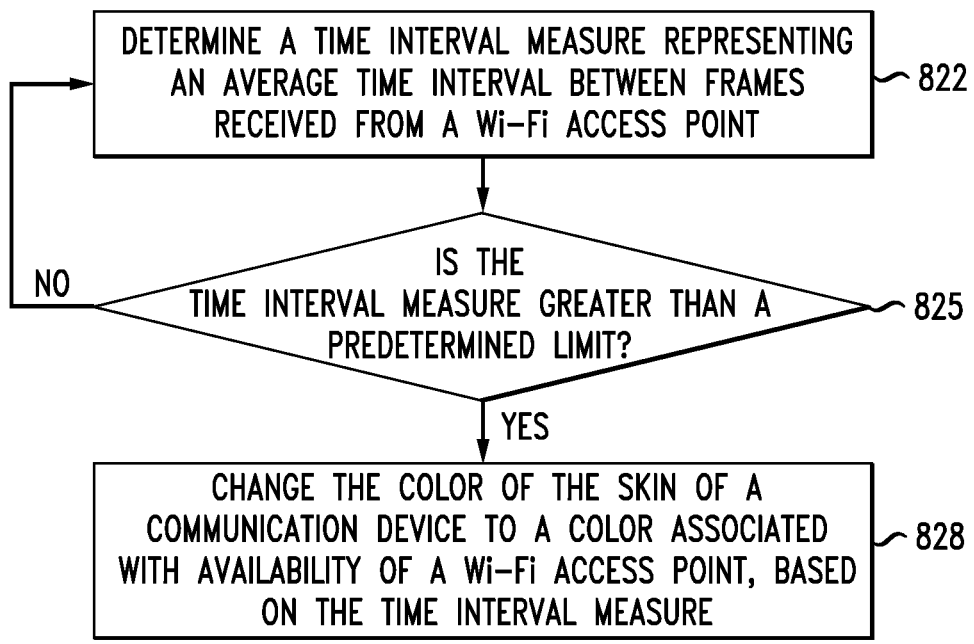
FIG. 8C is a flowchart of a method of controlling the color of the skin of a communication device in accordance with an embodiment.

In one embodiment, the load measure comprises a time interval measure. FIG. 8C is a flowchart of a method of controlling the color of the skin of a communication device in accordance with an embodiment. At step 822, a time interval measure representing an average time interval between frames received from a Wi-Fi access point is determined. Accordingly, event detection module 220 may examine two frames from access point 515 and determine the time interval between the two frames. In accordance with another embodiment, event detection module 220 examines a plurality of frames transmitted by an access point 515 during the predetermined time interval T, and determines an average time interval measure representing an average time interval between successive frames. In the illustrative embodiment, a determination is made whether or not the time interval measure is more than a predetermined limit. For example, the predetermined limit may be an average time interval associated with a level of traffic at which a desired quality of service can be maintained; greater average time intervals are associated with less traffic while smaller average time intervals are associated with higher levels of traffic and expected delays. The predetermined limit may be established empirically, for example, or by another method.

Referring to block 825, if the time interval measure is greater than the predetermined limit, event detection module 220 concludes that the access point has sufficient capacity to handle additional traffic while maintaining a desired quality of service, and the routine proceeds to step 828. If the time interval measure is less than (or equal to) the predetermined limit, event detection module 220 concludes that the access point in question is currently handling a high level of traffic, and cannot handle additional traffic and maintain a desired level of quality of service. The routine then returns to step 822 and the time interval measure may be determined again for the particular access point, or a time interval measure may be determined for another access point, for example.

Figures 10, 11A:
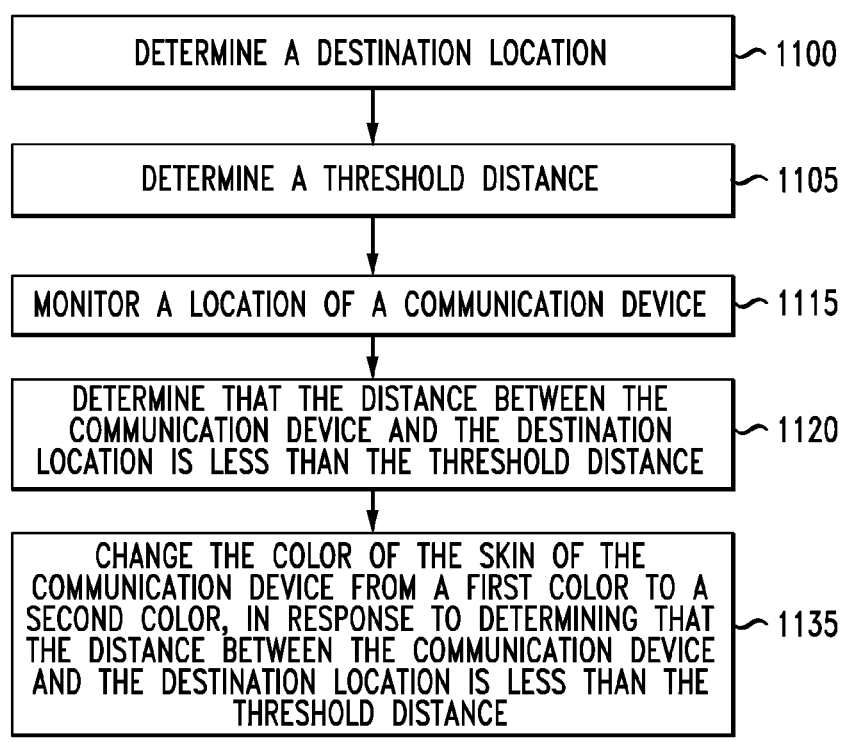
FIG. 10 shows an example of a skin color look-up table in accordance with another embodiment.
FIG. 11A is a flowchart of a method of providing a visible signal to a user in accordance with an embodiment.

At step 828, the skin of communication device 100 is changed to a color associated with availability of a Wi-Fi access point, based on the time interval measure. For example, event detection module 220 may identify a predetermined color associated with availability of a Wi-Fi access point. In an illustrative embodiment, event detection module 220 accesses a look-up table to identify an appropriate color. FIG. 10 shows a skin color look-up table 483-B in accordance with another embodiment. Referring to record 1021, the color associated with an available access point is PURPLE. Accordingly, in the illustrative embodiment, event detection module 220 causes the color of skin 115 to change from a first color (e.g, gray, the default color) to PURPLE (indicating an available access point).

Figure 8D:
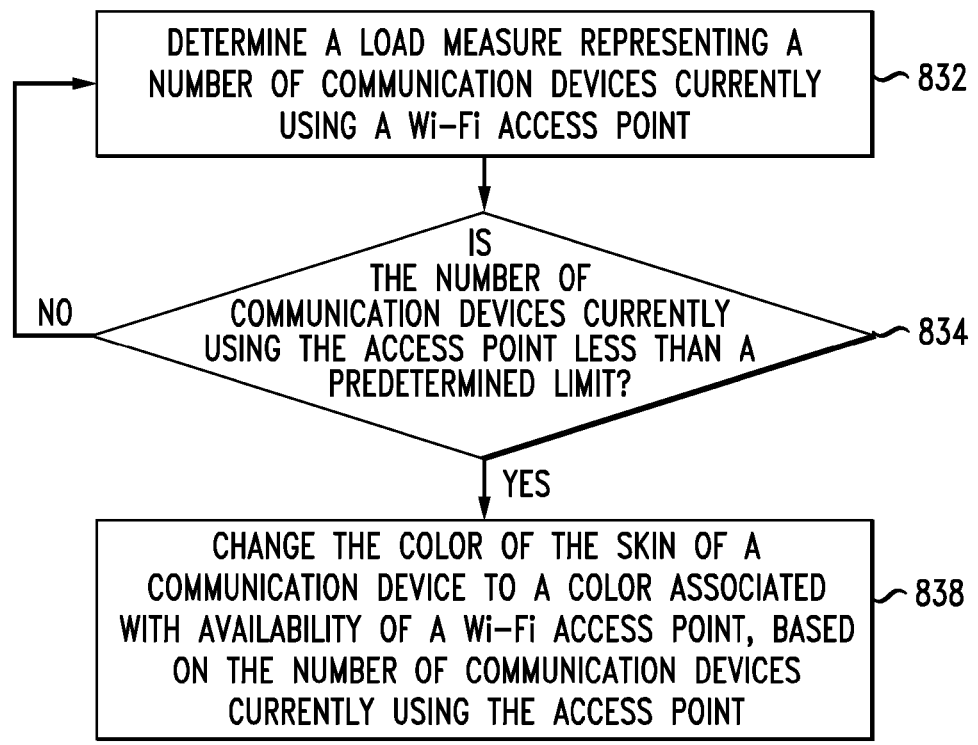
FIG. 8D is a flowchart of a method of generating a visible signal by controlling the color of the skin of a communication device in accordance with an embodiment.

In another embodiment, a load measure of a node is determined based on a number of communication devices currently using the node. FIG. 8D is a flowchart of a method of generating a visible signal by controlling the color of the skin of a communication device in accordance with an embodiment. At step 832, a load measure representing a number of communication devices currently using a Wi-Fi access point is determined. The number of communication devices using an access point may be determined based on information in the frames received from the access point. Referring to FIG. 6B, event detection module 220 may examine DESTINATION MAC ADDRESS field 660 in each of the frames received from the access point; based on the destination MAC address information obtained in this manner, communication device 100 determines a number of communication devices that are currently using the access point.

Referring to block 834, if the number of communication devices currently using a Wi-Fi access point is less than a predetermined limit, event detection module 220 concludes that the access point has sufficient capacity to handle additional traffic and maintain a desired quality of service, and the routine proceeds to step 838. If the number of communication devices currently using the Wi-Fi access point is greater than (or equal to) the predetermined limit, event detection module 220 determines that the access point in question is currently handling a high level of traffic, and cannot handle additional traffic and maintain a desired level of quality of service. In such event, the routine returns to step 832 and a load measure may be determined again for the particular access point, or a load measure may be determined for another access point, for example.

At step 838, the skin of a communication device is changed to a color associated with availability of a Wi-Fi access point, based on the number of communication devices currently using the Wi-Fi access point. Referring again to look-up table 483-B (shown in FIG. 10), skin control module 260 may cause the color of skin 115 to change from a first color to PURPLE (indicating availability of a Wi-Fi access point).

In another embodiment, processor 220 calculates a load measure associated with an access point based on an average time interval between frames received from a Wi-Fi access point and the number of communication devices associated with the particular access point. For example, event detection module 220 may determine a load measure by dividing the number of communication devices associated with the particular access point by the average time interval between frames received from a Wi-Fi access point.

In another embodiment, communication device 100 generates a visible signal indicating that a cellular base station has available capacity sufficient to handle additional traffic and maintain a desired quality of service. In one embodiment, communication device 100 identifies a base station 120 and determines a load measure for the base station 520.

Figure 9A:
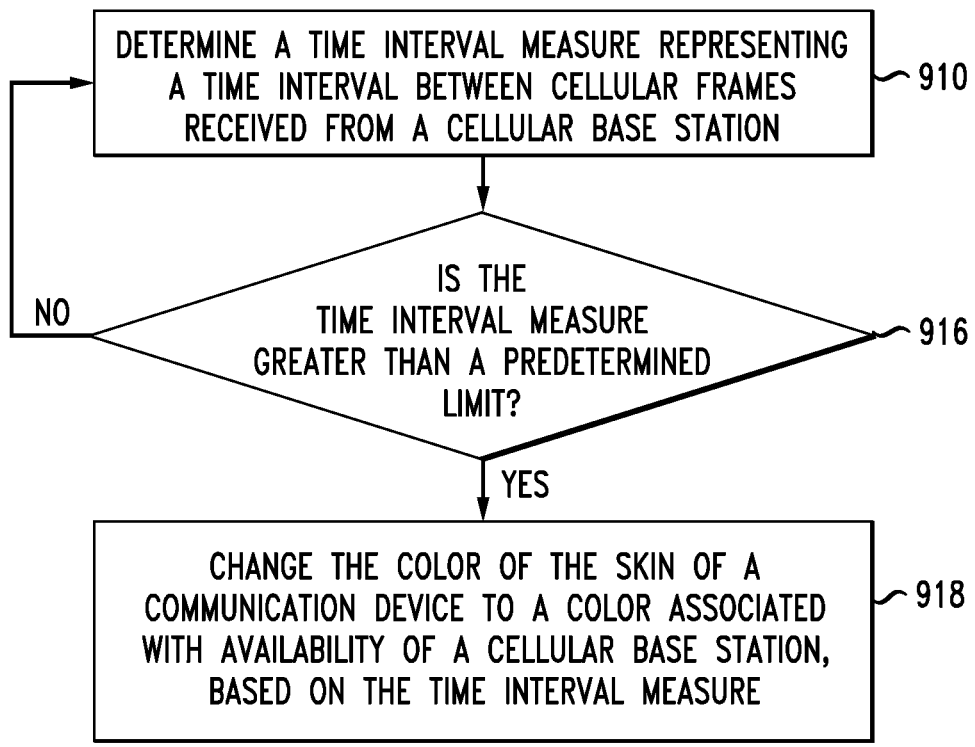
FIG. 9A is a flowchart of a method of generating a visible signal representing availability of a base station in accordance with an embodiment.

FIG. 9A is a flowchart of a method of generating a visible signal representing availability of a base station in accordance with an embodiment. In an illustrative embodiment, communication device 100 monitors one or more cellular channels, and receives a plurality of cellular frames transmitted by a base station 520. In the illustrative embodiment, cellular frames are received via antenna 135, for example. Processor 210) identifies the corresponding base station based on information in the cellular frames. For example, processor 210 may examine information in BASE STATION ID field 705 in a cellular frame to identify a base station 520.

At step 910, a time interval measure representing a time interval between cellular frames received from the base station is determined. While communication device 100 continues to receive frames from the identified base station 520, event detection module 220 determines a time interval measure representing a time interval between cellular frames received from the base station 520. For example, event detection module 220 may determine an average time interval measure representing an average time interval between frames received during a predetermined time period T.

Referring to block 916, if the time interval measure is greater than a predetermined limit, event detection module 220 concludes that the base station in question has available capacity sufficient to handle additional traffic and provide a desired quality of service, and the method proceeds to step 918. If the time interval measure is less than (or equal to) the predetermined limit, event detection module 220 determines that the base station in question does not have available capacity to handle additional traffic and maintain a desired quality of service, and the method returns to step 910. Another time interval measure may be determined for the particular base station, or a time interval measure may then be determined for another base station.

At step 918, the skin of communication device 100 is changed to a color associated with availability of a cellular base station, based on the time interval measure. Referring again to FIG. 10, event detection module 220 may access record 1023 of look-up table 483-B and determine that the color associated with an available cellular base station is YELLOW. Event detection module 220 accordingly instructs skin control module 260 to change the color of skin 115 to YELLOW. Skin control module 260 receives the instruction and in response changes the color of skin 115 to YELLOW.

In accordance with an embodiment, if communication device 100 is receiving no signal (or a number of frames fewer than a predetermined limit) from any Wi-Fi access point, and is receiving no signal (or a number of frames fewer than a predetermined limit) from any cellular base station, event detection module 220 may determine the condition to constitute a NO RECEPTION condition, and instruct skin control module 260 to change the color of skin 115 to a color associated with NO RECEPTION. In the illustrative embodiment of FIG. 10, record 1024 indicates that the color BROWN is associated with a NO RECEPTION condition. Accordingly, the color of skin 115 may be changed to BROWN when communication device 100 encounters a NO RECEPTION condition.

Figure 9B:
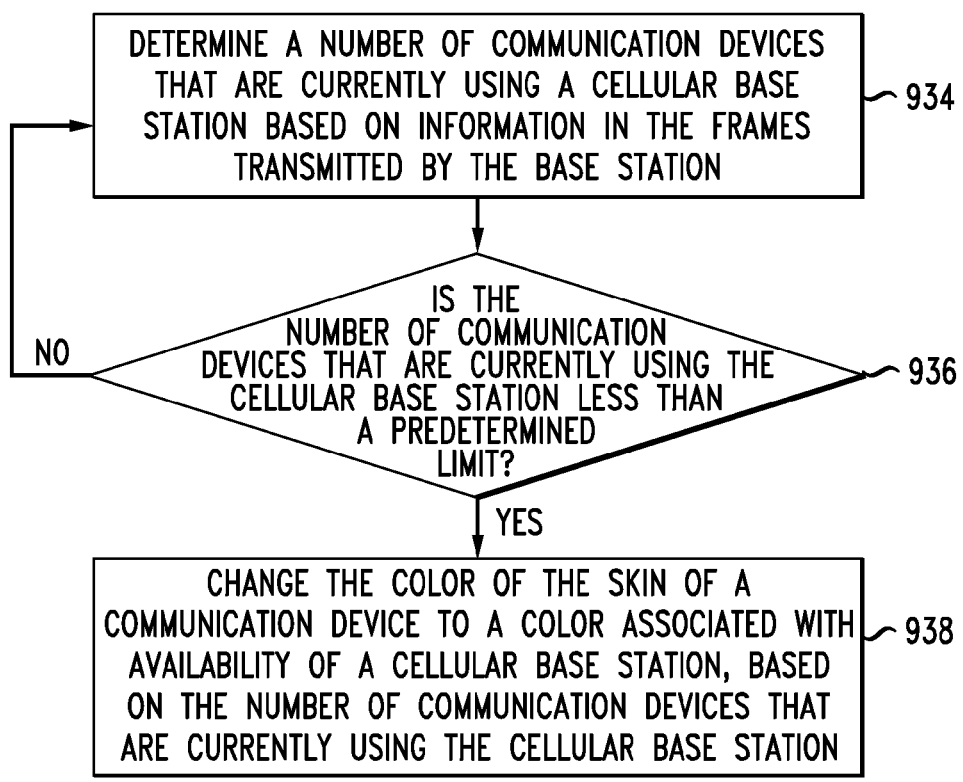
FIG. 9B is a flowchart of a method of generating a visible signal indicating availability of a cellular base station in accordance with another embodiment.

FIG. 9B is a flowchart of a method of generating a visible signal indicating availability of a cellular base station in accordance with another embodiment. At step 934, a number of communication devices that are currently using a base station is determined based on information in the frames transmitted by the base station. Accordingly, referring to FIG. 7B, event detection module 220 may examine the assignment of subchannels within DL-MAP field 710 to identify one or more communication devices that are currently using the base station 520. Based on the information within DI-MAP field 710, event detection module 220 determines a number of communication devices that are currently using the base station 520. In another embodiment, communication device 100 may examine subchannel assignment information within UL-MAP field 745 to identify communication devices that are currently using a base station. Alternatively, communication device 100 may examine the information in DL-MAP field 710 and the information in UL-MAP field 745 to identify communication devices that are currently using a base station 520.

Referring to block 936, if the number of communication devices that are currently using the base station is less than a predetermined limit, event detection module 220 determines that the base station in question has available capacity sufficient to handle additional traffic and provide a desired quality of service, and the method proceeds to step 938. If the number of communication devices that are currently using the base station is greater than (or equal to) the predetermined limit, event detection module 220 determines that the base station in question does not have available capacity to handle additional traffic and maintain a desired quality of service, and the method returns to step 934. Another measure of the number of devices currently using the base station may then be determined, or a measure of the number of devices currently using another base station may be determined.

At step 938, the skin of a communication device is changed to a color associated with availability of a cellular base station, based on the number of communication devices that are currently using the base station. For example, skin control module 260 may change the color of skin 115 to YELLOW.

In accordance with another embodiment, a load measure associated with a base station is determined based on a number of communication devices associated with the base station and a time interval measure associated with the base station. For example, in one embodiment, communication device 100 may determine a subframe utilization value indicating a portion of subframes within a cellular frame transmitted by the base station 520 that are currently being used. For example, processor 220 may determine the subframe utilization value by dividing the number of subframes within DL-MAP field 710 that are currently being used to transmit information by the total number of subframes within DL-MAP field 710.

Event detection module 220 now determines a load measure associated with the base station, based at least on the number of communication devices associated with the base station and the time interval measure (determined using the methods described above). For example, event detection module 220 may calculate a load measure associated with a particular base station by calculating the product of the subframe utilization value and the number of communication devices associated with the base station, and dividing the product by the time interval measure.

In another embodiment, communication device 100 uses the methods described above to determine respective load measures for multiple nodes. If the load measures for a plurality of nodes indicates that each of the respective nodes among the plurality of nodes has available capacity sufficient to handle additional traffic and maintain a desired quality of service, communication device 100 causes skin 115 to change from a first color to a second color associated with availability of a node, and presents the nodes and the corresponding load measures to the user, for example, on display 110 (shown in FIGS. 1 and 2). Communication device 100 may then allow the user to select a node from among the nodes presented. When a selection of a node is received from the user, communication device 100 connects to the selected node.

Other Embodiments

In one embodiment, event detection module 220 utilizes the mapping and location detection capabilities of mapping and directions module 229. Event detection module 220 may also from time to time access utilize mapping and directions module 229, and/or other similar information sources, to identify locations, addresses, landmarks, building, houses, stores, other commercial establishments, etc., that are near communication device 100.

In one embodiment, the color of skin 115 is changed from a first color to a second color when communication device 100 is within a predetermined distance of a specified location or landmark. FIG. 11A is a flowchart of a method of providing a visible signal to a user in accordance with an embodiment. In an illustrative embodiment, a user wishes to employ communication device 100 to find a desired destination. Accordingly, the user turns on communication device 100. When device 100 is turned on, the color of skin 115 is the default color.

At step 1100, a destination location is determined. The destination location may be specified by a user. For example, a user may employ a graphical user interface (presented on display 110 by event detection module 220, for example) and specify a desired location, such as a building, house, park, street, highway exit, etc., by typing the location on a keypad, for example.

In an illustrative embodiment, a user wishes to go to the ABC Building but is not familiar with the area around the ABC Building, and therefore does not know exactly how to get to the ABC Building. The user accordingly accesses a graphical user interface displayed on display 110, and specifies the ABC Building and its address, as a destination location.

At step 1105, a threshold distance is determined. The threshold distance may be selected by a user, or may be determined automatically. For example, a default distance may be used. In the illustrative embodiment, the user specifies, via the graphical user interface, a threshold distance of one thousand feet. The user now begins to drive in the general direction of the ABC Building. At step 1115, a location of a communication device is monitored. For example, event detection module 220 may use GPS information to monitor the location of communication device 100 as the user travels. Event detection module 220 further monitors the distance between communication device 100 and the destination location, for example, by using GPS functionality and information provided by mapping and directions module 229.

At step 1120, a determination is made that the distance between the communication device and the destination location is less than the threshold distance. In the illustrative embodiment, after the user has driven for some time, event detection module 220 determines that the distance between the communication device 100 and the ABC Building is less than one thousand feet.

At step 1135, the color of the skin of the communication device is changed from a first color to a second color, in response to determining that the distance between the communication device and the destination location is less than the threshold distance. In the illustrative embodiment, when event detection module 220 detects that the distance from communication device 100 to the ABC Building is less than one thousand feet, event detection module 220 causes skin 115 to change from the default color to a second, predetermined color. In other embodiments, other locations and/or landmarks may be selected. For example, event detection module 220 may cause skin 115 to change color to a predetermined color when the user's car approaches (e.g., is within one mile of) a specified exit on a highway. Similarly, a user driving around an unfamiliar town looking for a particular store may program event detection module 220 to change color when the user's car is within a quarter-mile of the specified store.

In another embodiment, a user may provide to communication device 100 (via a keypad, for example) a start location and a destination location. Event detection module 220 may then access mapping and directions module 229 and/or access an online mapping/directions application to determine a preferred route from the start location to the destination location. Event detection module 220 may then designate one or more intermediate locations along the preferred route at each of which the user is required to perform an action, such as an exit where the user must exit a highway, an intersection where the user must turn right or left, a door which the user must enter, etc. Event detection module 220 provides the preferred route to the user, and as the user follows the preferred route, event detection module 220 monitors the user's progress along the route (by monitoring the location of communication device 100 vis-à-vis the preferred route). For example, an exit on a highway where the user must exit the highway may be the first designated intermediate location, an intersection where the user must turn right may be the second designated intermediate location, etc. When the user approaches (or is within a predetermined distance of) one of the designated intermediate locations (such as an exit on a highway), event detection module 220 causes skin 115 to change from a first color to a second, predetermined color indicating that the user is approaching a location where an action must be taken. For example, skin 115 may change from a default color to ORANGE when the user is within two miles of a particular exit along the preferred route.

In one embodiment, event detection module 220 may continue to monitor the location of communication device 100, and when communication device 100 is within a second predetermined distance of the identified landmark, event detection module 220 causes skin 115 to change to a third predetermined color indicating that the user will imminently arrive at the location in question (e.g., the exit on the highway). In the illustrative example described above, skin 115 may change to RED when the user is within one mile of the particular exit along the preferred route.

Figure 11B:
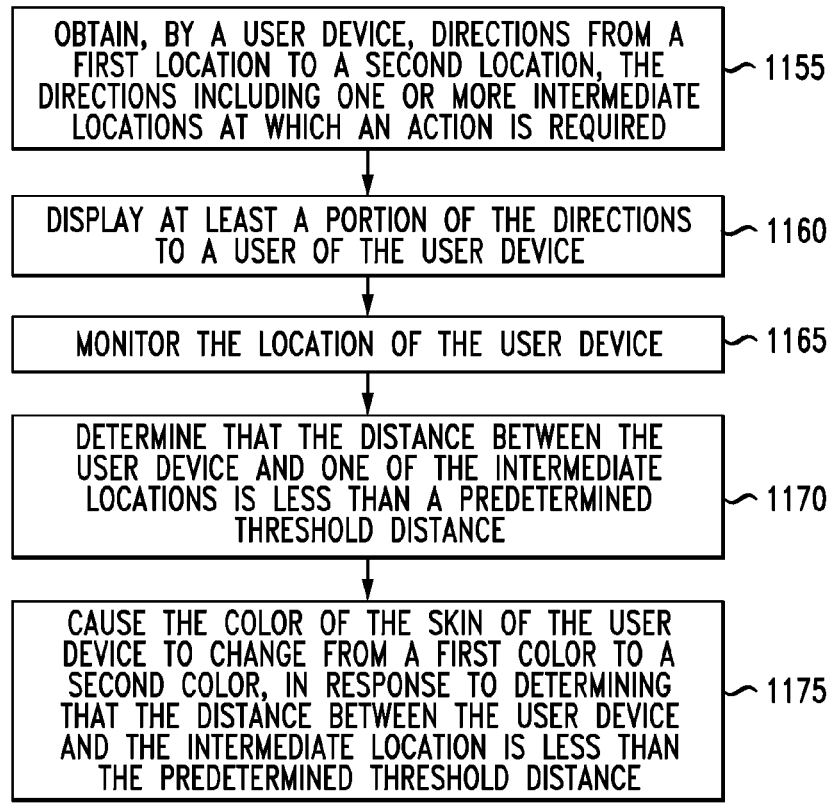
FIG. 11B is a flowchart of a method of providing a visible signal to a user in accordance with an embodiment.

FIG. 11B is a flowchart of a method of providing a visible signal to a user in accordance with an embodiment. At step 1155, directions from a first location to a second location, including one or more intermediate locations at which an action is required, are obtained. For example, communication device 100 may prompt the user to enter a start location and an end location, and mapping and directions module 229 may access an Internet-based mapping application to obtain directions from the start location to the end location. The directions include at least the start location, one or more intermediate locations, and the end location, and a plurality of steps. For example, the directions may specify, in part, that the user should follow a first specified road from the start location to a first intermediate location (e.g., an exit or a landmark), and then turn right onto a second specified road, etc.

At step 1160, at least a portion of the directions are displayed to a user of the user device. Communication device 100 displays some or all of the directions on display 110, for example. The user may scroll up and/or down to view the directions, if necessary.

At step 1165, the location of the user device is monitored. As the user travels from the start location to the end location, device 100 monitors the user's location, for example by using GPS functionality.

At step 1170, a determination is made that the distance between the user device and one of the intermediate locations is less than a predetermined threshold distance. For example, event detection module 220 may determine that the distance from communication device 100 to the first intermediate location is less than a predetermined distance. The predetermined threshold distance may be any suitable distance, such as one mile, 500 yards, etc.

At step 1175, the color of the skin of the user device is caused to change from a first color to a second color, in response to the determination that the distance between the user device and the intermediate location is less than the predetermined threshold distance. For example, event detection module 220 may instruct skin control module 260 to cause skin 115 to change (from a default color) to a predetermined color in order to provide a visible signal to the user that he or she is approaching an intermediate location where an action is required. Skin control module 260 accordingly causes skin 115 to change to the specified predetermined color. When the user observes the changed skin color, the user is alerted that he or she is approaching an intermediate location and that an action will be required (such as exiting a highway, for example).

In another embodiment, instead of, or in addition to, changing from a first color to a second color, skin control module 260 may cause skin 115 to produce other types of visible signals. For example, skin control module 260 may cause skin 115 to flash, alternate between two different colors, change from a first brightness level to a second brightness level, etc.

In another embodiment, event detection module 220 monitors products offered and/or available at stores, restaurants, companies, and other commercial establishments near communication device 100. For example, event detection module 220 may receive signals transmitted wirelessly by stores, restaurants, companies, etc., concerning products and services offered, advertisements, sales, menus, etc. Event detection module 220 may also access one or more websites, online databases, etc., via the Internet to determine products and services offered, advertisements, sales, menus, etc. by various commercial establishments located near communication device 100.

A user may employ a graphical user interface (presented on display 110 by event detection module 220, for example) and specify a parameter related to desired product or service, such as (without limitation) a brand of shoes, a brand of paint, a type or size of air conditioner, a type of legal service, a type of food, a name of a company or firm, etc., by typing the location on a keypad, for example. The user may also specify a predetermined distance which will trigger an alert. Event detection module 220 subsequently monitors the commercial establishments near communication device 100 as the user travels, and identifies products and services offered by such nearby establishments. When event detection module 220 detects that communication device 100 is located within the predetermined distance from a commercial establishment that satisfies the required criteria (e.g., a store that offers the desired product or service), event detection module 220 causes skin 115 to change from a first color to a second, predetermined color. For example, a user may program event detection module 220 to cause skin 115 to change color to ORANGE when the user is within two hundred meters of a store that sells comic books, or within one hundred yards of a store that sells flat screen televisions, or within a quarter-mile of a Chinese food restaurant.

In one embodiment, event detection module 220 may continue to monitor the location of communication device 100, and when communication device 100 is within a second predetermined distance of the commercial establishment (or other specified location), event detection module 220 causes skin 115 to change to a third predetermined color indicating that the user will imminently arrive at the location in question (e.g., the store that sells comic books). In the illustrative example described above, skin 115 may change to RED when the user is within one hundred meters of the desired destination (e.g., the store that sells comic books). Alternatively, skin 115 may flash between a first color and second color to signal imminent arrival at the desired location.

In another embodiment, event detection module 220 monitors incoming telephone calls received by communication device 100. A user may employ a graphical user interface (presented on display 110 by event detection module 220, for example) and specify a telephone number or a particular individual. When event detection module 220 detects that a call from the specified telephone number or individual has been received by communication device 100, event detection module 220 causes skin 115 to change from a first color to a predetermined, second color. For example, a user may program event detection module 220 to change color when a call is received from the user's mother.

In another embodiment, event detection module 220 may monitor incoming emails (or other message types) and cause skin 115 to change from a first color to a second predetermined color when an email or message is received from a specified individual or sender, or when an email or other message containing specified content is received. For example, event detection module 220 may cause skin 115 to change from a first color to a second color when an email is received from the user's automobile dealer indicating that it is time for the user to take his or her car to the dealer for a scheduled maintenance visit, for an oil change, etc.

In another embodiment, the appearance of skin 115 may be altered in response to the detection of an event or condition, by changing from a particular color with a first intensity to the same color with a second intensity. In another embodiment, the appearance of skin 115 may be altered by changing from a first color to a second color that "glows."

In accordance with another embodiment, a website configured to synchronize the colors of the skins of multiple communication devices is provided. Each of a plurality of users, each having a communication device similar to device 100 (each with a skin capable of changing color), may log into the website and register his or her communication device. For example, each user may register a device based on a telephone number. The users may then participate in a collective activity, such as a game, or a competition. The website may include a software application adapted to monitor the progress of the collective activity (e.g., game, competition, etc.), and cause the skin of a selected communication device to change from a first color to a second color when a predetermined condition or even occurs. For example, the users may participate in a "treasure hunt" type game in which they must look for various objects provided on a list or map. When a user finds one of the objects listed, the user must indicate that the object has been found on the website. The software application, in response to a message from a user that an object has been found, may cause the skins of all of the communication devices of all of the users to change to a first predetermined color. Similarly, when the last object is found, the software application, may cause the skins of all of the communication devices of all of the users to change to a second predetermined color. The software application may furthermore monitor the locations of the participants and, when it is determined that a particular user is within a predetermined distance of one of the objects, cause the skin of that participant's device to change to a selected color (such as orange, or red, indicating "hot").

In accordance with another embodiment, a retail establishment, such as a store, may maintain a software application adapted to detect a communication device of a user when the user enters the store. The software application may further monitor the user's movements around the store. In addition, the software application may have the authority to provide special offers such as one-time discounts, prizes, special giveaways, etc., to selected customers. For example, such special treatment may be given randomly, or to repeat customers, or on another basis. Thus, at a selected time while a user is in the store, the software application may select the user as the recipient of a special offer, and transmit a message to the user's communication device notifying the user of the special offer. The software application may also transmit a request or instruction to the device requesting that the device cause its skin to change to a selected color associated with the special offer. For example, the software application may instruct the user's device to change to BLUE, to flash between YELLOW and WHITE, etc. When the user sees the changed color, the user may access and read the message, and then decide whether or not to accept the offer.

In accordance with another embodiment, a skin of a communication device may change from a first color to a second color when an anticipated event occurs. For example, a user carrying communication device 100 when exiting from an airplane may use device 100 to determine when his or her suitcase has been placed onto the relevant baggage carousel. Before travelling, the user may place a radio frequency identification (RFID) tag onto the suitcase; the RFID tag generates an identification signal associated with the user. As suitcases are removed from the airplane (after a flight), a scanning device at the airport scans the RFID tag, detects the identification signal transmitted by the RFID tag, and identifies the owner of the suitcase based on the signal. The scanning device (or another processing device) then transmits a signal to communication device 100 (carried by the owner) indicating that the owner's suitcase has been removed from the airplane and placed on the baggage carousel. Device 100 receives the signal and, in response, causes the color of skin 115 to change from a first color to a second color to inform a user that his or her suitcase is now available.

In various embodiments, the method steps described herein, including the method steps described in FIGS. 3, 8A-8D, 9A-9B, and/or 11, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 3, 8A-8D, 9A-9B, and/or 11, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 12:
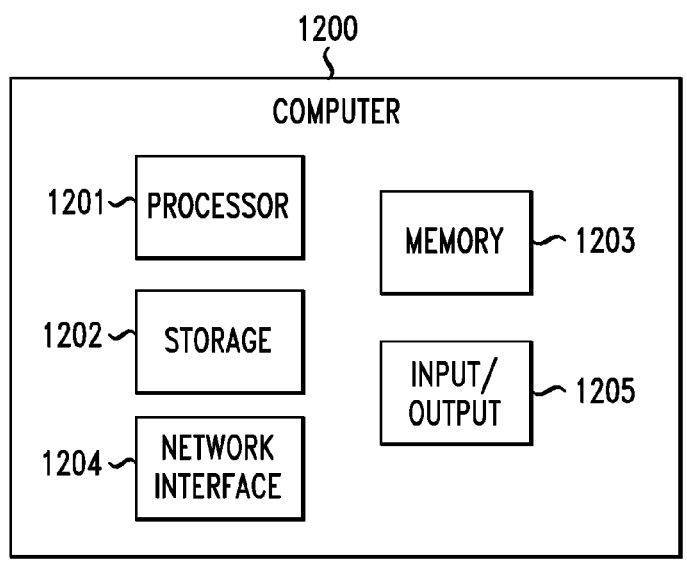
FIG. 12 shows components of an exemplary computer that may be used to implement certain embodiments of the invention.

A high-level block diagram of an exemplary computer that may be used to implement systems, apparatus and methods described herein is illustrated in FIG. 12. Computer 1200 includes a processor 1201 operatively coupled to a data storage device 1202 and a memory 1203. Processor 1201 controls the overall operation of computer 1200 by executing computer program instructions that define such operations. The computer program instructions may be stored in data storage device 1202, or other computer readable medium, and loaded into memory 1203 when execution of the computer program instructions is desired. Thus, the method steps of FIGS. 3, 8A-8D, 9A-9B, and/or 11 can be defined by the computer program instructions stored in memory 1203 and/or data storage device 1202 and controlled by the processor 1201 executing the computer program instructions. For example, the computer program instructions can be implemented as computer executable code programmed by one skilled in the art to perform an algorithm defined by the method steps of FIGS. 3, 8A-8D, 9A-9B, and/or 11. Accordingly, by executing the computer program instructions, the processor 1201 executes an algorithm defined by the method steps of FIGS. 3, 8A-8D, 9A-9B, and/or 11. Computer 1200 also includes one or more network interfaces 1204 for communicating with other devices via a network. Computer 1200 also includes one or more input/output devices 1205 that enable user interaction with computer 1200 (e.g., display, keyboard, mouse, speakers, buttons, etc.).

Processor 1201 may include both general and special purpose microprocessors, and may be the sole processor or one of multiple processors of computer 1200. Processor 1201 may include one or more central processing units (CPUs), for example. Processor 1201, data storage device 1202, and/or memory 1203 may include, be supplemented by, or incorporated in, one or more application-specific integrated circuits (ASICs) and/or one or more field programmable gate arrays (FPGAs).

Data storage device 1202 and memory 1203 each include a tangible non-transitory computer readable storage medium. Data storage device 1202, and memory 1203, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1205 may include peripherals, such as a printer, scanner, display screen, etc. For example, input/output devices 1205 may include a display device such as a cathode ray tube (CRT) or liquid crystal display (LCD) monitor for displaying information to the user, a keyboard, and a pointing device such as a mouse or a trackball by which the user can provide input to computer 1200.

Any or all of the systems and apparatus discussed herein, including communication device 100, and one or more components thereof, including processor 210, event detection module 220, skin control module 260, mapping and directions module 229, skin 115, memory 235, battery 291, display 110, transceiver 280, input/output 270, antenna 135, etc., may be implemented using a computer such as computer 1200.

One skilled in the art will recognize that an implementation of an actual computer or computer system may have other structures and may contain other components as well, and that FIG. 12 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of controlling a skin of a communication device, the method comprising:
receiving, by a communication device, from a user, a start location and a destination location;
determining a route between the start location and the destination location, the route defining at least one highway exit at which an action is required;
determining, by the communication device, a first distance between the communication device and the highway exit at which the action is required in accordance with the route, at a first time;
causing a color of a skin of the communication device to change from a first color to a second color, in response to determining that the first distance between the communication device and the highway exit at which the action is required in accordance with the route is less than a first predetermined distance;
determining a second distance between the communication device and the highway exit at which the action is required in accordance with the route, at a second time; and
causing the skin of the communication device to change to a third color, in response to determining that the second distance between the communication device and the highway exit at which the action is required in accordance with the route is less than a second predetermined distance;
wherein:
the communication device comprises a mobile telephone having a display adapted to display text and images;
the skin does not include the display; and
the skin comprises at least one surface located on at least two sides of the communication device, one of the at least two sides being a side that does not include the display.

2. The method of claim 1, further comprising:
determining a location of the communication device based on GPS signals.

3. The method of claim 1, wherein the communication device comprises a mobile telephone.

4. The method of claim 1, wherein the skin comprises one of an electrochromic material, an electrophoretic material, an electrowetting display, a dielectrophoresis display, and a bistable LCD.

5. A mobile communication device comprising:
a display adapted to display text and images;
a skin adapted to change from a first color to a second color, wherein:
  the skin does not include the display; and
  the skin comprises at least one surface located on at least two sides of the communication device, one of the at least two sides being a side that does not include the display; and
at least one processor adapted to:
  receive, from a user, a start location and a destination location;
  determine a route between the start location and the destination location, the route defining at least one highway exit at which an action is required;
  determine a first distance between the communication device and the highway exit at which an action is required in accordance with the route, at a first time;
  cause a color of a skin of the communication device to change from a first color to a second color, in response to determining that the first distance between the communication device and the highway exit at which the action is required is less than a first predetermined distance;
  determine a second distance between the communication device and the highway exit at which the action is required, at a second time; and
  cause the skin of the communication device to change to a third color, in response to determining that the second distance between the communication device and the highway exit at which the action is required is less than a second predetermined distance.

6. The communication device of claim 5, wherein the communication device comprises a mobile telephone.

7. The communication device of claim 5, wherein the skin comprises one of an electrochromic material, an electrophoretic material, an electrowetting display, a dielectrophoresis display, and a bistable LCD.

* * * * *